No. 687,583. Patented Nov. 26, 1901.
E. F. SHAW.
SAW HANDLE.
(Application filed Aug. 27, 1900.)
(No Model.) 2 Sheets—Sheet 1.
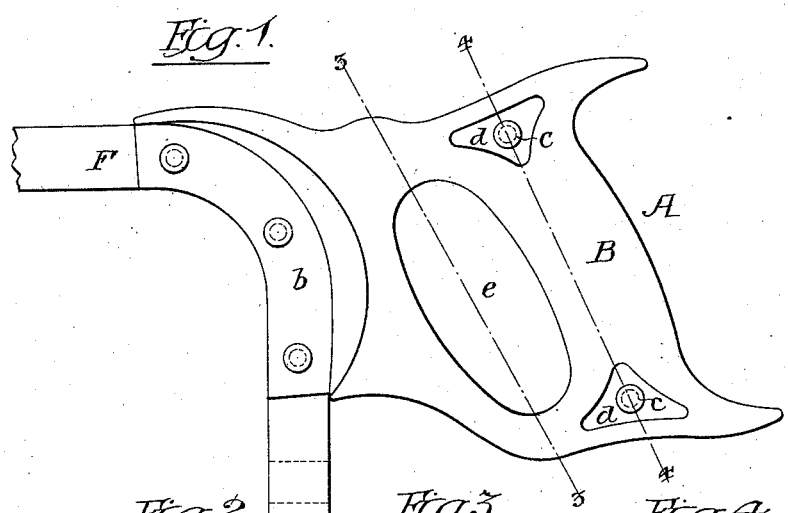
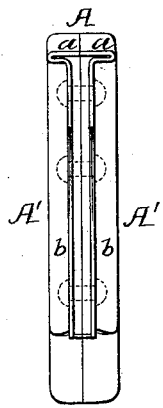
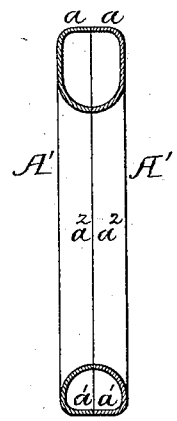
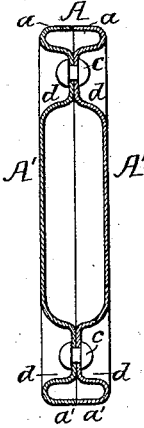
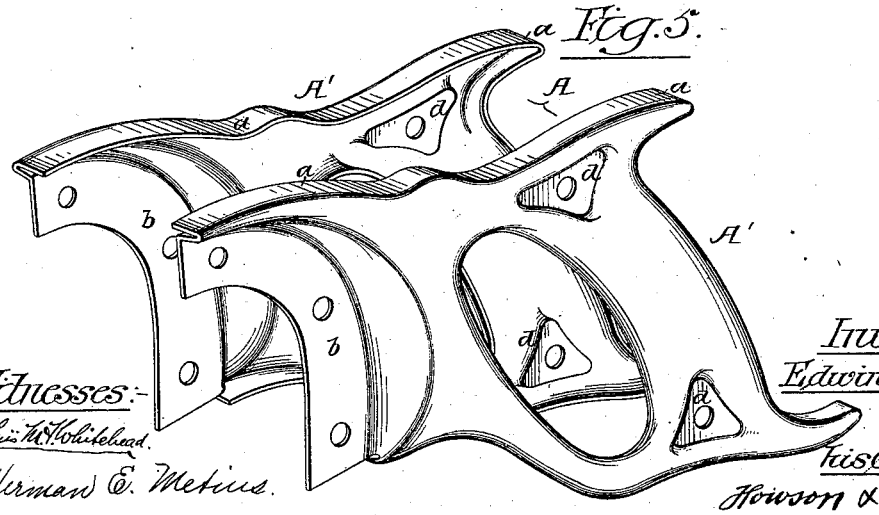
Witnesses:
Louis W. Whitehead.
Herman E. Metius.
Inventor:
Edwin F. Shaw.
by his Attorneys
Howson & Howson
THE NORRIS PETERS CO., PHOTO-LITHO., WASHINGTON, D. C.

No. 687,583. Patented Nov. 26, 1901.
E. F. SHAW.
SAW HANDLE.
(Application filed Aug. 27, 1900.)
(No Model.) 2 Sheets—Sheet 2.
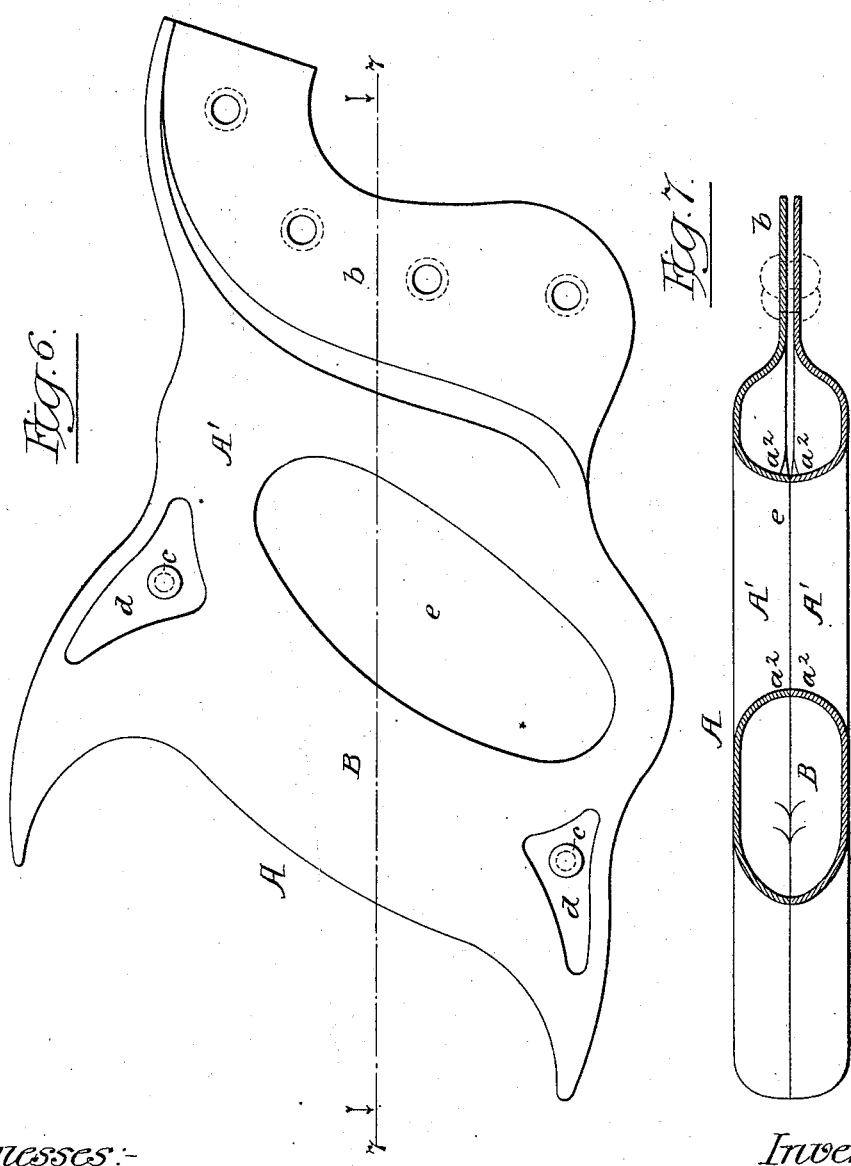
Witnesses:-
Inventor:-
Edwin F. Shaw.
by his Attorneys:
Howson & Howson

UNITED STATES PATENT OFFICE.

EDWIN F. SHAW, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

SAW-HANDLE.

SPECIFICATION forming part of Letters Patent No. 687,583, dated November 26, 1901.

Application filed August 27, 1900. Serial No. 28,238. (No model.)

*To all whom it may concern:*

Be it known that I, EDWIN F. SHAW, a citizen of the United States, residing in Philadelphia, Pennsylvania, have invented certain Improvements in Saw-Handles, of which the following is a specification.

The object of my invention is to construct a metal saw-handle which can be readily manufactured and which can be subjected to moisture without detriment to the handle.

My invention is especially adapted for use as a handle for butchers' saws, which in some climates must be sterilized; but it will be understood that the handle can be used for other saws without departing from my invention.

I do not claim, broadly, in this application a metallic saw-handle, as the broad claims are found in a companion application filed August 14, 1900, Serial No. 26,868.

In the accompanying drawings, Figure 1 is a side view of my improved handle attached to the back of a butcher's saw. Fig. 2 is an end view of the handle. Fig. 3 is a section on the line 3 3, Fig. 1. Fig. 4 is a section on the line 4 4, Fig. 1. Fig. 5 is a perspective view showing the two sections of a handle detached. Fig. 6 is a side view of a woodsaw handle made in accordance with my invention; and Fig. 7 is a sectional view on the line 7 7, Fig. 6.

Referring in the first instance to Figs. 1 to 5, A is the handle, made, preferably, of sheet-steel and formed of two struck-up sections A' A'. The sections are secured together by rivets $c$, as clearly shown in Figs. 1 and 4. The upper and lower flanges $a\ a'$ of each section A' are turned in, so that the edges of the flanges of the sections abut, as clearly shown in Fig. 3. These flanges add considerable strength to the handle, and the handle, being hollow, can be made comparatively light.

In order that the handhold B may be perfectly smooth, I turn in the flanges $a^2$ around the handhold and around the eye $e$, so as to present a smooth surface.

The end $b$ of each section is shaped as shown in Fig. 5, so as to form a recess for the reception of the back F of the saw. The back can be secured to the flanges $b\ b$ by rivets or screw-bolts, as desired.

I preferably make the depressions $d\ d$ deep, so that the surface of one section will come in contact with the surface of the other in order that when the rivets $c$ are applied a rigid fastening is assured.

Any number of rivets may be used to attach the sections together, depending greatly upon the shape of the handle and its size.

While I have shown in Fig. 1 a handle particularly adapted for butchers' saws, I have shown in Figs. 6 and 7 a handle particularly adapted to an ordinary handsaw. The essential features are embodied in the handle shown in Figs. 6 and 7, and therefore the said figures need not be further described.

I claim as my invention—

As a new article of manufacture, a saw-handle made of two sections, each section stamped up from sheet metal having internal flanges at the upper and lower edges, and internal flanges around the handhold, and having depressed flanges at one end forming a narrow recess for the back of the saw, substantially as described.

In testimony whereof I have signed my name to this specification in the presence of two subscribing witnesses.

EDWIN F. SHAW.

Witnesses:
 WILL. A. BARR,
 H. HAYES AIKENS.